(12) United States Patent
Yim et al.

(10) Patent No.: US 12,126,035 B2
(45) Date of Patent: Oct. 22, 2024

(54) POUCH-TYPE SECONDARY BATTERY AND METHOD OF MANUFACTURING THE SAME

(71) Applicant: LG Chem, Ltd., Seoul (KR)

(72) Inventors: Sang Wook Yim, Daejeon (KR); Jun Yeob Seong, Daejeon (KR); Jun Kyu Park, Daejeon (KR); Ki Taek Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 849 days.

(21) Appl. No.: 16/976,982

(22) PCT Filed: Dec. 10, 2019

(86) PCT No.: PCT/KR2019/017354
§ 371 (c)(1),
(2) Date: Aug. 31, 2020

(87) PCT Pub. No.: WO2020/130455
PCT Pub. Date: Jun. 25, 2020

(65) Prior Publication Data
US 2021/0028417 A1 Jan. 28, 2021

(30) Foreign Application Priority Data

Dec. 18, 2018 (KR) ........................ 10-2018-0163948

(51) Int. Cl.
*H01M 50/183* (2021.01)
*H01M 10/04* (2006.01)
*H01M 50/105* (2021.01)

(52) U.S. Cl.
CPC ......... *H01M 50/183* (2021.01); *H01M 10/04* (2013.01); *H01M 50/105* (2021.01)

(58) Field of Classification Search
CPC .. H01M 50/183; H01M 10/04; H01M 50/105; H01M 50/119; H01M 50/121;
(Continued)

(56) References Cited

U.S. PATENT DOCUMENTS

| 6,632,538 B1 * | 10/2003 | Yamazaki | H01M 50/178 |
| | | | 429/254 |
| 2002/0127362 A1 * | 9/2002 | Jansen | H01M 50/119 |
| | | | 903/952 |

(Continued)

FOREIGN PATENT DOCUMENTS

| CN | 101755351 A | 6/2010 |
| CN | 205159424 U | 4/2016 |

(Continued)

OTHER PUBLICATIONS

Machine translation of Korean Patent Document 2014-0032710A, published Mar. 17, 2014. (Year: 2014).*

(Continued)

*Primary Examiner* — Stewart A Fraser
*Assistant Examiner* — Lilia Nedialkova
(74) *Attorney, Agent, or Firm* — Lerner David LLP

(57) ABSTRACT

A pouch-type secondary battery and a method of manufacturing same are capable of completely protecting a metal layer from moisture or air by forming an insulating coating layer including a conformal coating layer on the metal layer exposed at a cut surface of a battery case. The method includes a first step of preparing a battery case including an upper case and a lower case by cutting a laminate sheet including an outer coating layer, a metal layer, and an inner coating layer; a second step of receiving an electrode assembly between the upper case and the lower case; a third step of forming a sealing portion by contacting outer peripheries of the upper case and the lower case; and a fourth step of forming a conformal coating layer on a side surface of the sealing portion so as to prevent exposure of the metal layer.

10 Claims, 6 Drawing Sheets

(58) Field of Classification Search
CPC ............ H01M 50/129; H01M 50/186; H01M 50/193; B05D 1/02; B05D 2503/00; B05D 2505/50; B05D 2507/01; B29K 2023/12; B29L 2031/7146; F16J 15/123; Y02E 60/10; Y02P 70/50; B29C 65/02; B29C 66/0382; B29C 66/1122; B29C 66/133; B29C 66/137; B29C 66/432; B29C 66/71; B29C 66/72321; B29C 66/73921; B29C 66/8322

See application file for complete search history.

(56) References Cited

U.S. PATENT DOCUMENTS

| | | | | |
|---|---|---|---|---|
| 2004/0076877 | A1* | 4/2004 | James | H01M 8/0286 |
| | | | | 29/623.2 |
| 2010/0003594 | A1* | 1/2010 | Hong | H01M 50/172 |
| | | | | 429/163 |
| 2010/0209768 | A1 | 8/2010 | Ahn et al. | |
| 2015/0037663 | A1* | 2/2015 | Uhm | H01M 50/183 |
| | | | | 429/179 |
| 2017/0141362 | A1* | 5/2017 | Ijuin | H01M 50/553 |
| 2017/0194606 | A1* | 7/2017 | Lim | H01M 10/058 |
| 2017/0202089 | A1 | 7/2017 | Yun et al. | |

FOREIGN PATENT DOCUMENTS

| | | | |
|---|---|---|---|
| CN | 107534103 | A | 1/2018 |
| JP | 2006210201 | A | 8/2006 |
| JP | 2006286471 | A | 10/2006 |
| JP | 2007265879 | A | 10/2007 |
| JP | 2017123456 | A | 7/2017 |
| KR | 20080005627 | A | 1/2008 |
| KR | 20120060315 | A | 6/2012 |
| KR | 20130139026 | A | 12/2013 |
| KR | 20140019761 | A | 2/2014 |
| KR | 20140032710 | A | 3/2014 |
| KR | 2015050081 | A * | 5/2015 |
| KR | 20150050081 | A | 5/2015 |
| KR | 20160103255 | A | 9/2016 |
| KR | 20160115191 | A | 10/2016 |
| KR | 2016131706 | A * | 11/2016 .......... H01M 10/049 |
| KR | 20160131706 | A | 11/2016 |
| KR | 20170002221 | A | 1/2017 |

OTHER PUBLICATIONS

Machine translation of Korean Patent Document 2015-0050081A, published May 8, 2015. (Year: 2015).*

Machine translation of Korean Patent Document, KR 2016-131706A, published Nov. 16, 2016. (Year: 2016).*

International Search Report for Application No. PCT/KR2019/017354 mailed Apr. 3, 2020, 2 pages.

Extended European Search Report including Written Opinion for Application No. 19899199.4 dated May 20, 2021, 6 pages.

Search Report dated Feb. 23, 2022 from the Office Action for Chinese Application No. 201980009129.X issued Mar. 3, 2022, pp. 1-3.

* cited by examiner

[FIG. 1] PRIOR ART
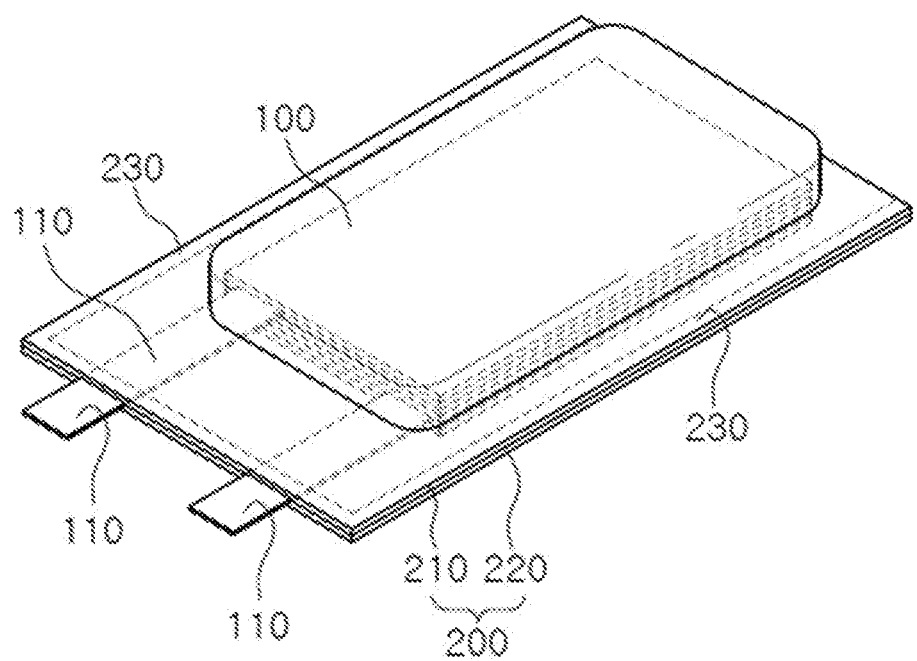

[FIG. 2]
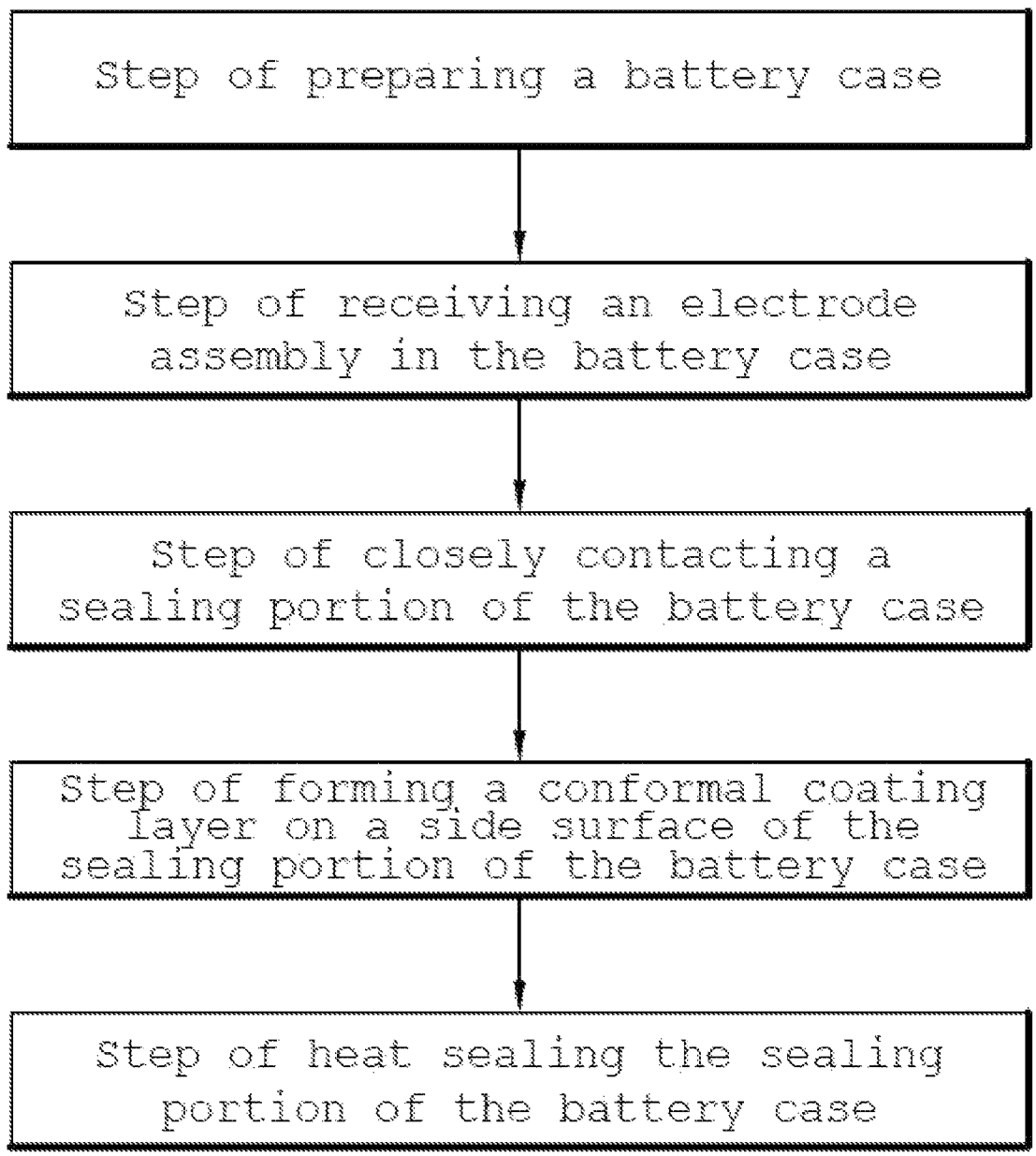

[FIG. 3]
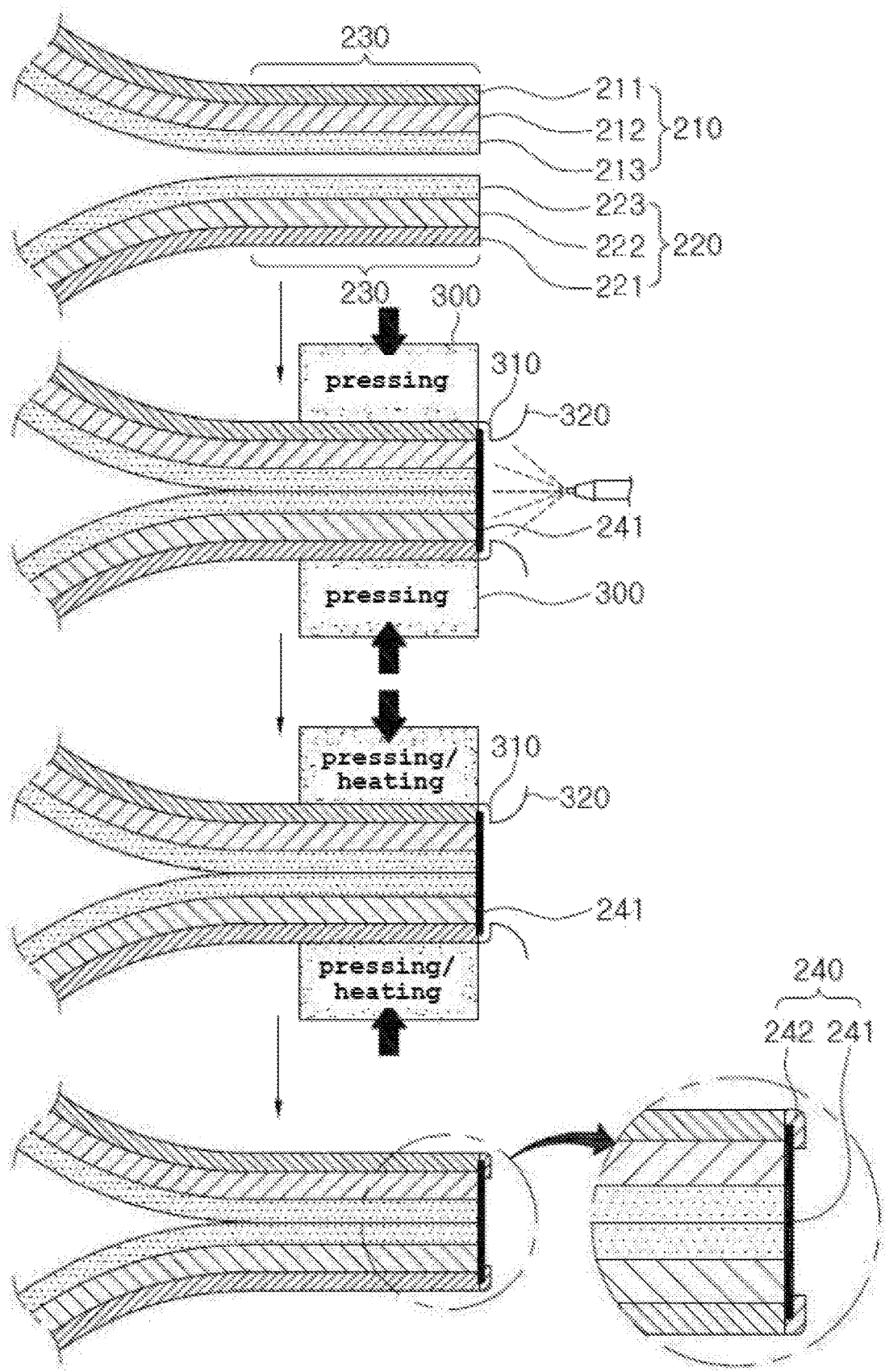

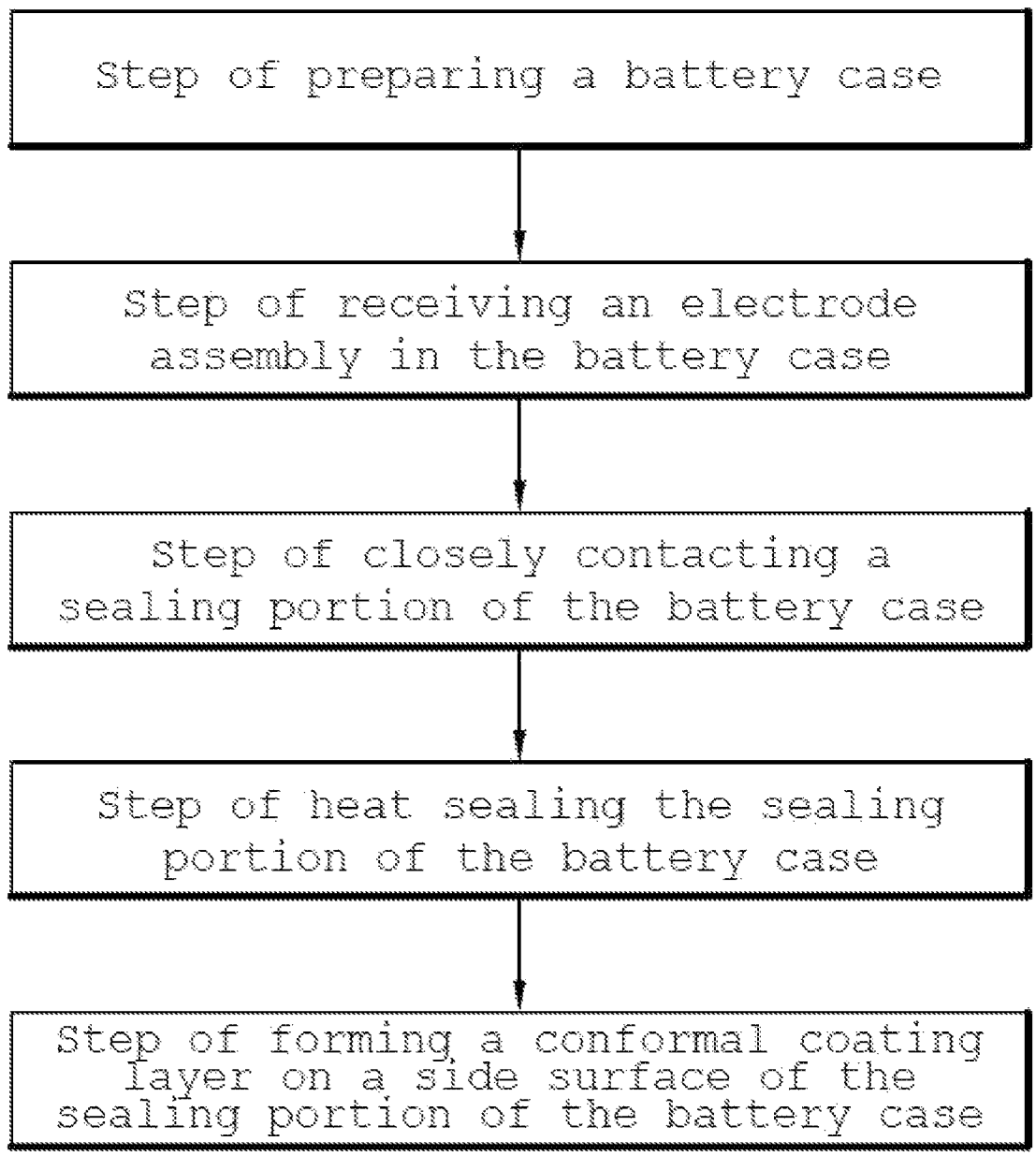

[FIG. 5]
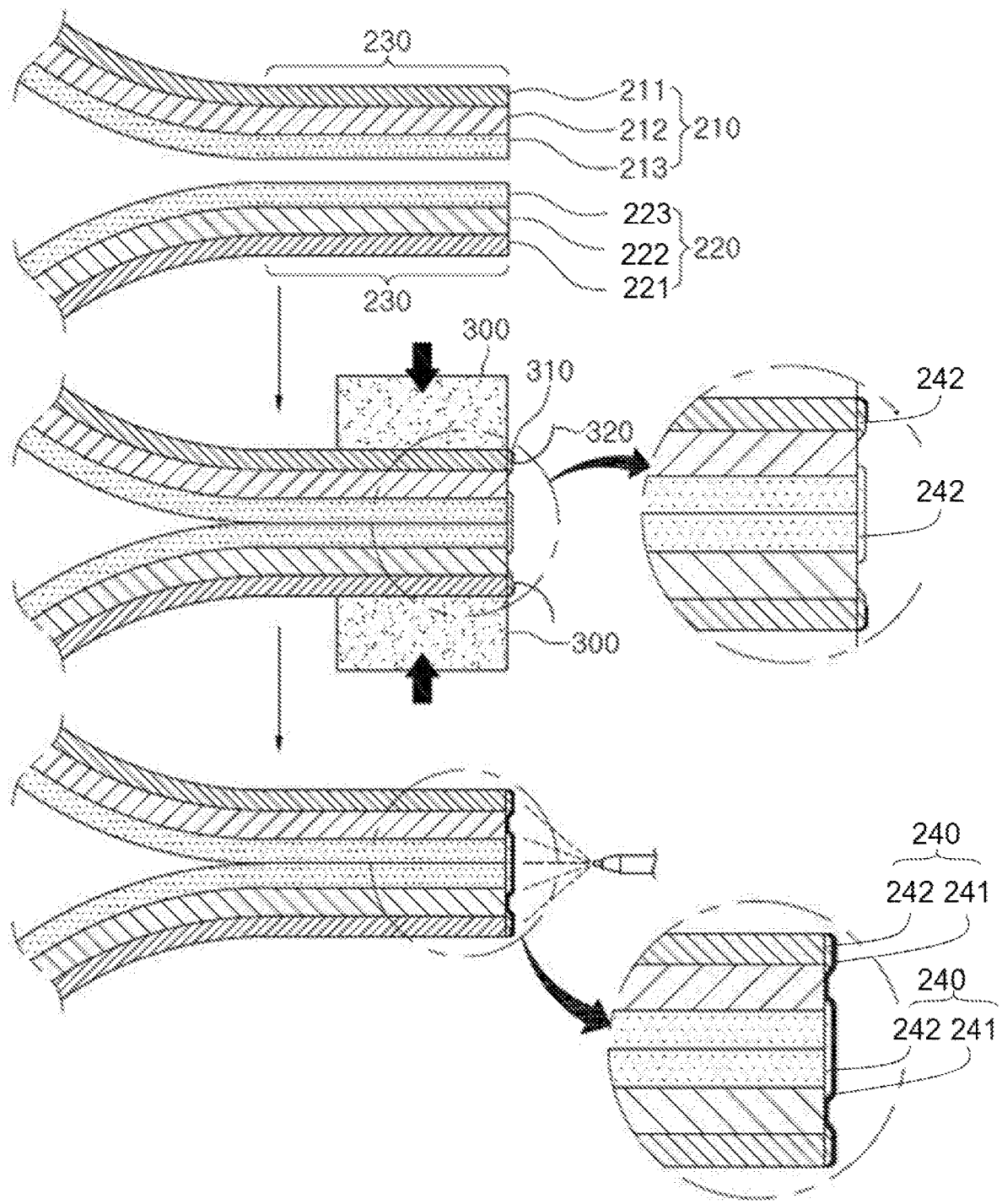

[FIG. 6]
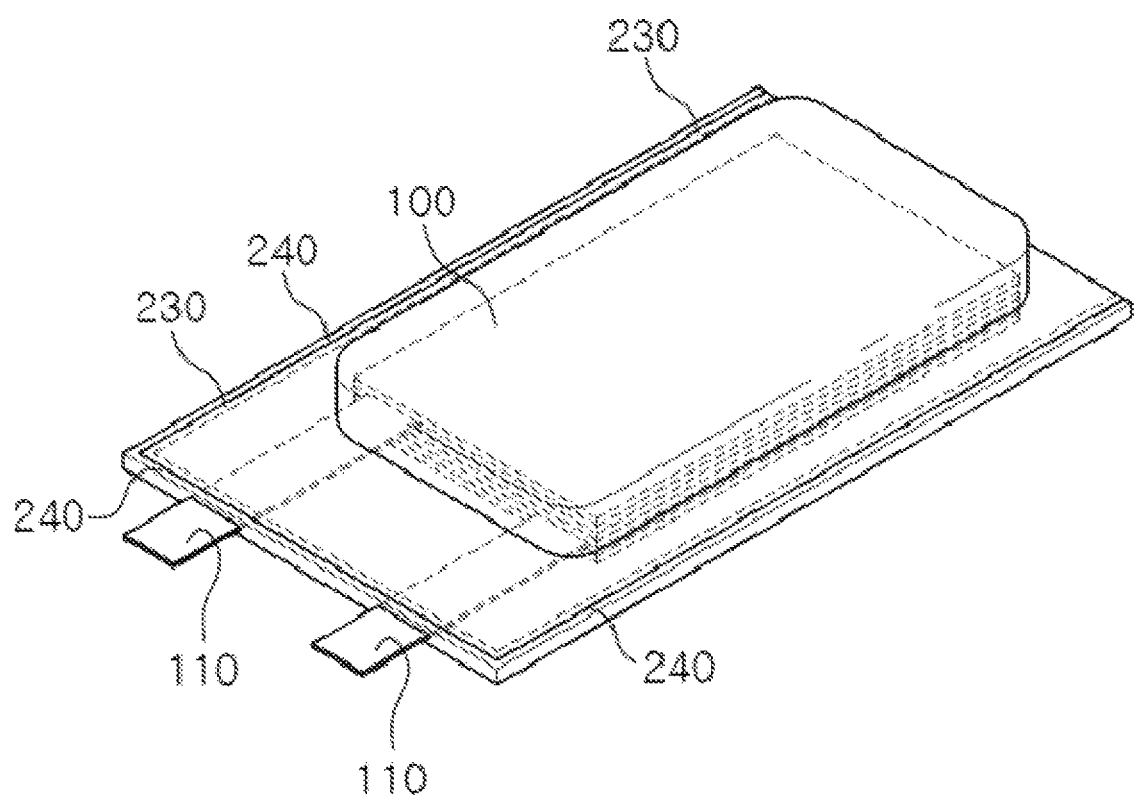

POUCH-TYPE SECONDARY BATTERY AND METHOD OF MANUFACTURING THE SAME

CROSS-REFERENCE TO RELATED APPLICATIONS

This application is a national phase entry under 35 U.S.C. § 371 of International Application No. PCT/KR2019/017354, filed Dec. 10, 2019, published in Korean, which claims the benefit of priority to Korean Patent Application No. 10-2018-0163948 filed on Dec. 18, 2018, the disclosures of which are hereby incorporated by reference herein their entireties.

TECHNICAL FIELD

The present invention relates to a pouch-type secondary battery and a method of manufacturing the same, and more particularly to a pouch-type secondary battery and a method of manufacturing the same, capable of completely protecting a metal layer from moisture or air by forming an insulating coating layer including a conformal coating layer on the metal layer exposed to a cut surface of a battery case.

BACKGROUND ART

As mobile devices have been continuously developed and the demand for mobile devices has increased, secondary batteries, which are capable of being charged and discharged, have been used as energy sources for various mobile devices. In addition, secondary batteries have also attracted considerable attention as energy sources for electric vehicles and hybrid electric vehicles, which have been presented as alternatives to existing gasoline and diesel vehicles using fossil fuels.

Based on the shape of a battery case, secondary batteries are classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

The electrode assembly, which is mounted in the battery case, is a power generating element that is configured to have a structure including a positive electrode, a negative electrode, and a separator that is interposed between the positive electrode and the negative electrode and that can be charged and discharged. The electrode assembly is classified as a jelly-roll type electrode assembly, which is configured to have a structure in which a long sheet type positive electrode and a long sheet type negative electrode, to which active materials are applied, are wound in the state in which a separator is disposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are disposed respectively between the positive electrodes and the negative electrodes. The jelly-roll type electrode assembly has advantages in that it is easy to manufacture the jelly-roll type electrode assembly and in that the jelly-roll type electrode assembly has high energy density per unit weight.

As shown in FIG. 1, such a secondary battery is configured to have a structure in which an electrode assembly 100 is mounted in a battery case 200 and in which positive and negative electrode tabs and are welded respectively to two lead members 110, which are exposed out of the battery case 200.

Meanwhile, the battery case 200 configured to receive the electrode assembly 100 has a structure in which a lower case 220 and an upper case 210 covering the lower case 220 are integrally formed, and a surface in which the lower case 220 and the upper case 210 contact each other is bent and folded. The lower case 220 and the upper case 210 have a laminate structure consisting of an inner coating layer, a metal layer and an outer coating layer. In the case of a general pouch-type secondary battery manufacturing method, a process of cutting the lower case 220 and the upper case 210 is involved, and in this process, the metal layer is exposed to the outside, which is a cause for significantly reducing the battery performance, such as accelerating the deterioration of the battery.

As an example of the conventional art for solving the above problem, Korean Patent Application Publication No. 2016-131706 discloses a method of manufacturing a pouch-type secondary battery including a step of receiving an electrode assembly between an upper sheathing member and a lower sheathing member of a pouch, a step of primary sealing outer regions of the upper sheathing member and the lower sheathing member of the pouch, a step of cutting edges of the upper sheathing member and the lower sheathing member of the sealed pouch, and a step of pressing distal ends of the upper sheathing member and the lower sheathing member of the cut pouch to form an additional sealing portion on a surface of a cutting portion of the upper sheathing member and the lower sheathing member.

According to the above-mentioned prior document, there is an advantage that it can prevent the disadvantage in which an exposed portion of a metal layer is in contact with a metal material of a pack unit by forming an additional sealing portion on the surface of the cutting portion of the sheathing member. Since a part of a material of an inner resin layer is leaked to the outside of the cut surface through the pressing to form the additional sealing portion, however, the inner resin layer should be formed thick, and thus there is a problem that the overall volume of the battery case is increased. In addition, there is a problem that a part of an exposed surface of the metal layer is not likely to form a sealing portion because the additional sealing portion is simply formed relying on the pressing.

DISCLOSURE

Technical Problem

The present invention has been made in view of the above problems, and it is an object of the present invention to provide a method of manufacturing a pouch-type secondary battery having a simple process and a low defective rate and a pouch-type secondary battery manufactured thereby by forming a coating layer covering a metal layer on a side surface of a sealing portion configured to couple an upper case and a lower case.

Technical Solution

In accordance with the present invention, the above and other objects can be accomplished by the provision of a pouch-type secondary battery, the pouch-type secondary battery including a battery case; and an electrode assembly received in the battery case, wherein the battery case is composed of an upper case and a lower case made of a laminate sheet including an outer coating layer, a metal layer, and an inner coating layer; wherein the battery case includes a sealing portion at which the upper case and the lower case are coupled to each other at an outer periphery of the upper case and the lower case; and wherein a conformal coating layer configured to prevent exposure of the metal layer is formed at a side surface of the sealing portion.

Here, a resin coating layer is further formed on a predetermined area of an outer surface of the conformal coating layer, and the resin coating layer may be formed by melting a portion of the outer coating layer.

Also, a resin coating layer may be further formed on a predetermined area of an inner surface of the conformal coating layer, and the resin coating layer may be formed by melting a portion of the outer coating layer and/or the inner coating layer.

Also, a method of manufacturing of a pouch-type secondary battery according to a preferred first embodiment of the present invention may include a first step of preparing a battery case including an upper case and a lower case by cutting a laminate sheet including an outer coating layer, a metal layer, and an inner coating layer; a second step of receiving an electrode assembly between the upper case and the lower case; a third step of forming a sealing portion by contacting an outer periphery of the upper case and an outer periphery of the lower case; and a fourth step of forming a conformal coating layer on a side surface of the sealing portion so as to prevent exposure of the metal layer.

Also, in the method of manufacturing of the pouch-type secondary battery according to the present invention, it is preferable to further include a fifth step of sealing the upper case and the lower case by heat sealing the sealing portion of the upper case and the lower case.

Also, the fifth step may include melting a part of the outer coating layer to form a resin coating layer on a predetermined area of an outer surface of the conformal coating layer.

Also, a method of manufacturing of a pouch-type secondary battery according to a preferred second embodiment of the present invention may include a first step of preparing a battery case including an upper case and a lower case by cutting a laminate sheet comprising an outer coating layer, a metal layer, and an inner coating layer; a second step of receiving an electrode assembly between the upper case and the lower case; a third step of forming a sealing portion by contacting an outer periphery of the upper case and an outer periphery of the lower case; a fourth step of sealing the upper case and the lower case by heat sealing the sealing portion at the outer periphery of the upper case and the lower case; and a fifth step of forming a conformal coating layer on a side surface of the sealing portion so as to prevent exposure of the metal layer.

Also, the fourth step may include melting a part of the outer coating layer and/or the inner coating layer to form a resin coating layer on a predetermined area of a side surface of the sealing portion.

In addition, a battery module according to the present invention may be the battery module including the pouch-type secondary battery.

In addition, a battery pack according to the present invention may be the battery pack including the battery module.

DESCRIPTION OF DRAWINGS

FIG. 1 is a perspective view showing a conventional pouch-type secondary battery.

FIG. 2 is a flowchart illustrating a method of manufacturing a pouch-type secondary battery according to a preferred first embodiment of the present invention.

FIG. 3 is a process diagram illustrating an assembly process of an upper case and a lower case according to the first embodiment.

FIG. 4 is a flowchart illustrating a method of manufacturing a pouch-type secondary battery according to a preferred second embodiment of the present invention.

FIG. 5 is a process diagram illustrating an assembly process of an upper case and a lower case according to the second embodiment.

FIG. 6 is a perspective view showing a pouch-type secondary battery manufactured according to the present invention.

BEST MODE

In the present application, it should be understood that the terms "comprises," "has," or "includes," etc. specify the presence of features, integers, steps, operations, components, parts, or combinations thereof described in the specification, but do not preclude the presence or addition of one or more other features, integers, steps, operations, components, parts, or combinations thereof.

In addition, the same reference numbers will be used throughout the drawings to refer to parts that perform similar functions or operations. In the case in which one part is said to be connected to another part in the specification, not only may the one part be directly connected to the another part, but also, the one part may be indirectly connected to the another part via a further part. In addition, that a certain element is included does not mean that other elements are excluded, but means that such elements may be further included unless mentioned otherwise.

Hereinafter, a pouch-type secondary battery and a method of manufacturing the same according to the present invention will be described with reference to the accompanying drawings.

FIG. 2 is a flowchart illustrating a method of manufacturing a pouch-type secondary battery according to a preferred first embodiment of the present invention, and FIG. 3 is a process diagram illustrating an assembly process of an upper case and a lower case according to the first embodiment.

The method of manufacturing the pouch-type secondary battery according to the first embodiment of the present invention includes a first step of preparing a battery case 200 including an upper case 210 and a lower case 220; a second step of receiving an electrode assembly 100 between the upper case 210 and the lower case 220; a third step of closely contacting a sealing portion 230 provided at an outer periphery of the upper case 210 and the lower case 220; a fourth step of forming a conformal coating layer 241 on a side surface of the sealing portion 230; and a fifth step of sealing the upper case 210 and the lower case 220 by heat sealing the sealing portion 230 of the outer periphery of the upper case 210 and the lower case 220.

First, the first step of preparing the battery case 200 including the upper case 210 and the lower case 220 and the second step of receiving the electrode assembly 100 between the upper case 210 and the lower case 220 will be described in more detail. The battery case 200 is a case accommodating the electrode assembly 100, and forms a space part which can accommodate the electrode assembly 100 using a laminate sheet made of outer coating layers 211 and 221; metal layers 212 and 222; and inner coating layers 213 and 223.

The inner coating layers 213 and 223 directly contact the electrode assembly 100. For this reason, it is necessary for the inner coating layers to exhibit an insulation property and electrolytic resistance. In addition, for hermetically sealing the inside and the outside of the pouch-type secondary battery, it is necessary for the inner coating layers to exhibit high sealability. Thus, it is necessary for a sealing portion, formed by thermally adhering inner coating layers of the upper case and the lower case, to exhibit excellent thermal adhesive strength.

The material for the inner coating layers 213 and 223 may be selected from among a polyolefin-based resin, such as polypropylene, polyethylene, polyethylene acrylate, or polybutylene, a polyurethane resin, and a polyimide resin, which exhibit excellent chemical resistance and good sealability. However, the present invention is not limited thereto. For example, polypropylene, which exhibits excellent mechanical properties, such as tensile strength, rigidity, surface hardness, and impact resistance, as well as excellent chemical resistance, is the most preferable.

The metal layers 212 and 222, which abut the inner coating layers 213 and 223, correspond to a barrier layer configured to prevent the permeation of moisture or various kinds of gases from the outside into the battery. An aluminum thin film, which is lightweight and exhibits excellent formability, may be used as a preferred material for the metal layer.

The outer coating layers 211 and 221 are provided at the other surfaces of the metal layers 212 and 222. The outer coating layers 211 and 221 may be made of a heat-resistant polymer that exhibits excellent tensile strength, moisture permeation prevention capability, and air permeation prevention capability such that the outer coating layer exhibits heat resistance and chemical resistance while protecting the electrode assembly 100. In an example, the outer coating layer may be made of nylon or polyethylene terephthalate. However, the present invention is not limited thereto.

The electrode assembly 100 received in the battery case 200 may be a jelly-roll type electrode assembly, which is configured to have a structure in which a long sheet type positive electrode and a long sheet type negative electrode are wound in the state in which a separator is interposed between the positive electrode and the negative electrode, a stacked type electrode assembly including unit cells, each of which is configured to have a structure in which a rectangular positive electrode and a rectangular negative electrode are stacked in the state in which a separator is interposed between the positive electrode and the negative electrode, a stack/folded type electrode assembly, which is configured to have a structure in which the unit cells are wound in the state in which the unit cells are disposed on a long separation film, or a laminated/stacked type electrode assembly, which is configured to have a structure in which the unit cells are stacked so as to be attached to each other in the state in which a separator is interposed between the unit cells. However, the present invention is not limited thereto.

A lead member 110, which generally includes a positive electrode lead and a negative electrode lead, is configured to have a structure in which a positive electrode tab (not shown) and a negative electrode tab (not shown), which are attached to the upper end of the electrode assembly 100, are electrically connected to the positive electrode lead and the negative electrode lead, respectively, by welding and in which the lead member 110 is exposed out of the battery case 200. At this time, in order to provide insulativity and sealability, a pair of insulative films (not shown), which face each other, is located in the region of the sealing portion 230 at which the positive electrode lead and the negative electrode lead are located, and the lead member 110 is disposed so as to extend between the pair of insulative films (not shown).

In the third step of closely contacting the sealing portion 230 provided at the outer periphery of the upper case 210 and the lower case 220, the sealing portion 230 of the upper case 210 and the sealing portion 230 of the lower case 220 are simply brought into close contact with each other, in the state in which the electrode assembly 100 is accommodated. Specifically, using a pair of sealing bars 300 located on the top and bottom of the sealing portion 230 of the upper case 210 and the lower case 220, the sealing portion 230 of the upper case 210 and the lower case 220 is pressed by a predetermined force to be in close contact with each other. At this time, the sealing portion 230 is not heated, and therefore, melting of the inner coating layers 213 and 223 and the outer coating layers 211 and 221 does not occur.

Here, the pair of sealing bars 300 are preferably further provided with a bent portion 310 bent at a predetermined angle, and a wing portion 320 extending from the bent portion 310.

More specifically, one of the sealing bars 300 in contact with the upper surface of the outer coating layer 211 of the upper case 210 includes the bent portion 310, which is bent downward after extending a predetermined length in the direction of a cut surface of the upper case 210, and the wing portion 320 extending upward while being inclined at a predetermined angle from the bent portion 310.

Also, the other sealing bar 300 in contact with the lower surface of the outer coating layer 221 of the lower case 220 includes the bent portion 310, which is bent upward after extending a predetermined length in the direction of a cut surface of the lower case 220, and the wing portion 320 extending downward while being inclined at a predetermined angle from the bent portion 310.

When forming the conformal coating layer 241 performed in the fourth step, the wing portion 320 is provided to protect the sealing bar 300 from the conformal coating resin to be sprayed, and to allow the conformal coating layer 241 to be seated intensively at a desired position. When heating the sealing portion 230 performed in the fifth step, the bent portion 310 is provided to induce a part of the resin of the molten outer coating layers 211 and 221 to move to a desired position.

The fourth step is to form the conformal coating layer 241 near the sealing portion 230, more specifically, on a side surface of the sealing portion 230, which is a cut surface of the laminate sheet.

The upper case 210 and the lower case 220 constituting the battery case 200 are obtained by cutting and forming the laminate sheet including the outer coating layers 211 and 221; the metal layers 212 and 222; and the inner coating layers 213 and 223. Therefore, even if the sealing portion 230 is heat-sealed, some or all of the metal layers 212 and 222 are generally exposed to the outside, and thus are in an electrically vulnerable state.

In the fourth step of the present invention, the conformal coating layer 241 is formed so that cut surfaces of the metal layers 212 and 222 are not exposed to the outside.

Here, the conformal coating layer 241 may be formed on the outer coating layers 211 and 221 and/or the inner coating layers 213 and 223 as well as the metal layers 212 and 222.

Meanwhile, conformal coating is a process of forming a protective film with a predetermined resin on the surface of a PCB assembly generally completed by mounting electronic components on a printed circuit board (PCB). In other words, when the PCB assembly is prepared, the protective film is formed by coating the surface of the PCB assembly with a resin for conformal coating through various coating methods. The protective film may be formed through various methods such as a spray coating method for discharging a resin for conformal coating, a flow coating method, a dip coating method for immersing a part of the PCB assembly in a liquid resin solution for conformal coating, or a chemical vapor deposition method.

Among the above various methods, a spray coating method is preferred in the present invention because the metal layers 212 and 222 exposed to the outside, or the outer coating layers 211 and 221 and/or the inner coating layers 213 and 223 adjacent to the metal layers 212 and 222 may be selectively coated.

The resin for conformal coating is not particularly limited as long as it can form a film on the metal layers 212 and 222, and may be subjected to a cooling process for a predetermined time for curing after spray coating.

Since the conformal coating layer 241 on the side surface of the sealing portion 230 formed through the above process perfectly coats the metal layers 212 and 222, causes of deteriorating the battery performance such as corrosion and insulation resistance caused by moisture or air coming into contact with the metal layers can be fundamentally blocked.

Subsequently, the fifth step is performed by heat sealing the sealing portion 230 of the outer periphery of the upper case 210 and the lower case 220 to seal the upper case 210 and the lower case 220.

In the fifth step, in order to maintain the sealed state of the pouch-type secondary battery, the battery case 200 is sealed by heating the sealing portions 230 provided along the periphery of the upper case 210 and the lower case 220 so that the inner coating layers 213 and 223 are bonded to each other.

At this time, a part of the resin of the outer coating layers 211 and 221 is also melted together to form a resin coating layer 242 on a predetermined area of the outer surface of the conformal coating layer 241. Since the resin coating layer 242 extends to the conformal coating layer 241 in the state in which it is connected to the outer coating layers 211 and 221, the resin coating layer 242 may prevent the conformal coating layer 241 from being exfoliated, and may more reliably protect the metal layers 212 and 222 from moisture or air.

Moreover, since it is not necessary to form a film on all surfaces of the metal layers 212 and 222, in order to manufacture the pouch-type secondary battery having the conformal coating layer, the thickness of the outer coating layers 211 and 221 may be the same as that of the conventional art, and it is possible to apply a conventional heat sealing temperature and time.

Next, a second embodiment of the present invention will be described. FIG. 4 is a flowchart illustrating a method of manufacturing a pouch-type secondary battery according to a preferred second embodiment of the present invention, and FIG. 5 is a process diagram illustrating an assembly process of an upper case and a lower case according to the second embodiment.

The method of manufacturing the pouch-type secondary battery according to the second embodiment of the present invention includes a first step of preparing a battery case 200 including an upper case 210 and a lower case 220; a second step of receiving an electrode assembly 100 between the upper case 210 and the lower case 220; a third step of closely contacting a sealing portion 230 provided at an outer periphery of the upper case 210 and the lower case 220; a fourth step of sealing the upper case 210 and the lower case 220 by heat sealing the sealing portion 230 of the outer periphery of the upper case 210 and the lower case 220; and a fifth step of forming a conformal coating layer 241 on a side surface of the sealing portion 230.

In the method of manufacturing the pouch-type secondary battery according to the second embodiment of the present invention, the configuration of the first step to the third step is identical to the first step to the third step of the first embodiment described above, and therefore a detailed description thereof will be omitted, and the fourth and fifth steps different from the first embodiment will be described.

In the fourth step of sealing the upper case 210 and the lower case 220 by heat sealing the sealing portion 230 of the outer periphery of the upper case 210 and the lower case 220, in order to maintain the sealed state of the pouch-type secondary battery, the battery case 200 is sealed by heating the sealing portions 230 provided along the periphery of the upper case 210 and the lower case 220 so that the inner coating layers 213 and 223 are bonded to each other.

At this time, a part of the molten resin of the outer coating layers 211 and 221 and/or the inner coating layers 213 and 223 flows to a side surface of the sealing portion 230 to form a resin coating layer 242 on some exposed part of the metal layers 212 and 222.

The fifth step is a step of forming a conformal coating layer 241 on the side surface of the sealing portion 230 so that the cut surfaces of the metal layers 212 and 222 are not exposed to the outside.

When the fourth step is performed, even if the resin of the outer coating layers 211 and 221 and/or the inner coating layers 213 and 223 does not cover all the exposed surfaces of the metal layers 212 and 222, the metal layers 212 and 222 can be protected from moisture or air since a film is formed on all the metal layers 212 and 222 by the conformal coating layer 241.

The conformal coating layer 241 has been described in detail in the first embodiment, and therefore a description thereof will be omitted.

FIG. 6 is a perspective view showing a pouch-type secondary battery manufactured according to the present invention. Specifically, the pouch-type secondary battery manufactured according to the first or second embodiment of the present invention includes an electrode assembly 100 received in a battery case 200 composed of an upper case 210 and a lower case 220 made of a laminate sheet including outer coating layers 211 and 221, metal layers 212 and 222, and inner coating layers 213 and 223.

In addition, a coating layer 240 for preventing exposure of the metal layer is additionally formed on a side surface of a sealing portion 230 for coupling the upper case 210 and the lower case 220.

Specifically, as described in FIG. 3, the pouch-type secondary battery manufactured according to the first embodiment is provided with the coating layer 240 formed in a shape in which a resin coating layer 242, formed by melting a part of the outer coating layer 211 and 221, is additionally formed on a predetermined area of the outer surface of a conformal coating layer 241.

On the other hand, as described in FIG. 5, the pouch-type secondary battery manufactured according to the second embodiment is provided with the coating layer 240 formed in a shape in which a resin coating layer 242, formed by melting a part of the outer coating layers 211 and 221 and/or the inner coating layers 213 and 223, is additionally formed on a predetermined area of the inner surface of the conformal coating layer 241.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Electrode assembly
110: Lead member
200: Battery case
210: Upper case
211: Outer coating layer 212: Metal layer
213: Inner coating layer
220: Lower case
221: Outer coating layer 222: Metal layer
223: Inner coating layer
230: Sealing portion
240: Coating layer
241: Conformal coating layer 242: Resin coating layer
300: Sealing bar
310: Bent portion
320: Wing portion

INDUSTRIAL APPLICABILITY

According to the method of manufacturing the pouch-type secondary battery and the pouch-type secondary battery of the present invention, since an additional coating layer is formed on a metal layer using a conformal coating method, which has a simple process, it is possible to completely block the metal layer from moisture or air without using a laminate sheet having a thick inner coating layer or an outer coating layer.

The invention claimed is:

1. A pouch-type secondary battery, comprising:
a battery case; and
an electrode assembly received in the battery case,
wherein the battery case is composed of an upper case and a lower case made of a laminate sheet comprising an outer coating layer, a metal layer, and an inner coating layer,
wherein the battery case includes a sealing portion at which the upper case and the lower case are coupled to each other at an outer periphery of the upper case and the lower case, and
wherein a conformal coating layer configured to prevent exposure of the metal layer is formed at a side surface of the sealing portion,
wherein
a resin coating layer is further formed on a predetermined area of an outer surface of the conformal coating layer, the resin coating layer being formed by melting a portion of the outer coating layer,
wherein the predetermined area of an outer surface of the conformal coating layer is disposed between a terminal end of the metal layer and the resin coating layer in a width direction of the pouch-type secondary battery, the terminal end extending perpendicular to the width direction.

2. A battery module comprising the pouch-type secondary battery according to claim 1.

3. A battery pack comprising the battery module according to claim 2.

4. The pouch-type secondary battery according to claim 1, wherein the side surface of the sealing portion is a cut surface of the laminate sheet with the metal layer exposed to the conformal coating layer.

5. The pouch-type secondary battery according to claim 1, wherein a portion of the outer coating layer and/or the inner coating layer is formed on a cut surface of the laminate sheet with the metal layer exposed to the conformal coating layer.

6. The pouch-type secondary battery of claim 1, wherein the conformal coating layer is a protective film including a resin.

7. The pouch-type secondary battery of claim 1, wherein the conformal coating layer is formed by spraying, dip coating, flow coating or chemical vapor depositing a resin.

8. A method of manufacturing a pouch-type secondary battery, the method comprising:
a first step of preparing a battery case including an upper case and a lower case by cutting a laminate sheet comprising an outer coating layer, a metal layer, and an inner coating layer;
a second step of receiving an electrode assembly between the upper case and the lower case;
a third step of forming a sealing portion by contacting an outer periphery of the upper case and an outer periphery of the lower case;
a fourth step of forming a conformal coating layer on a side surface of the sealing portion so as to prevent exposure of the metal layer; and
a fifth step of sealing the upper case and the lower case by heat sealing the sealing portion of the upper case and the lower case, wherein the fifth step includes melting a part of the outer coating layer to form a resin coating layer on a predetermined area of an outer surface of the conformal coating layer.

9. The method according to claim 8, wherein the fourth step of forming the conformal coating layer includes spraying a resin on the side surface of the sealing portion.

10. The method according to claim 9, wherein the side surface is a cut surface of the laminate sheet with the metal layer exposed to the conformal coating layer.

* * * * *